United States Patent
Zhao (10) Patent No.: US 10,009,290 B2
(45) Date of Patent: Jun. 26, 2018

(54) METHOD AND BROADBAND DEVICE FOR MODEM DIAL-UP

(71) Applicant: Huawei Device Co., Ltd., Shenzhen (CN)

(72) Inventor: Peng Zhao, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 274 days.

(21) Appl. No.: 14/901,880

(22) PCT Filed: Aug. 11, 2014

(86) PCT No.: PCT/CN2014/084058
§ 371 (c)(1),
(2) Date: Dec. 29, 2015

(87) PCT Pub. No.: WO2015/021893
PCT Pub. Date: Feb. 19, 2015

(65) Prior Publication Data
US 2016/0373375 A1 Dec. 22, 2016

(30) Foreign Application Priority Data
Aug. 15, 2013 (CN) .......................... 2013 1 0356543

(51) Int. Cl.
*G06F 15/173* (2006.01)
*H04L 12/927* (2013.01)
(Continued)

(52) U.S. Cl.
CPC ........ *H04L 47/803* (2013.01); *H04L 61/2007* (2013.01); *H04W 12/06* (2013.01)

(58) Field of Classification Search
CPC ... H04L 47/803; H04L 61/2007; H04W 12/06
See application file for complete search history.

(56) References Cited

U.S. PATENT DOCUMENTS

| | | |
|---|---|---|
| 2003/0065919 A1 | 4/2003 | Albert et al. |
| 2003/0099213 A1 | 5/2003 | Lee et al. |

(Continued)

FOREIGN PATENT DOCUMENTS

| | | |
|---|---|---|
| CN | 1422065 A | 6/2003 |
| CN | 101202720 A | 6/2008 |

(Continued)

OTHER PUBLICATIONS

Machine Translation and Abstract of Chinese Publication No. CN102355658, Feb. 15, 2012, 21 pages.

(Continued)

*Primary Examiner* — Ryan Jakovac
(74) *Attorney, Agent, or Firm* — Conley Rose, P.C.

(57) ABSTRACT

A method and a broadband device for modem dial-up terminal which relate the communication with an evolved high rate packet data (eHRPD) network by using an existing protocol by receiving, by a broadband device, a first link control protocol (LCP) request message of a wireless network side device; processing an extensible authentication protocol (EAP) authentication field of the first LCP request message into an authentication field supported by a dial-up terminal; sending the processed first LCP request message to the dial-up terminal; receiving a first LCP response message returned by the dial-up terminal; processing an authentication field of the first LCP response message into an authentication field supported by the wireless network side device; sending the processed first LCP response message to the wireless network side device; and acquiring an Internet Protocol (IP) address from the wireless network side device, and sending the IP address to the dial-up terminal.

20 Claims, 3 Drawing Sheets

(51) Int. Cl.
  *H04W 12/06* (2009.01)
  *H04L 29/12* (2006.01)

(56) References Cited

U.S. PATENT DOCUMENTS

| | | | |
|---|---|---|---|
| 2008/0003981 A1* | 1/2008 | Sharma | H04L 63/08 |
| | | | 455/411 |
| 2008/0151784 A1 | 6/2008 | Abrol et al. | |
| 2009/0113522 A1* | 4/2009 | Crassous | H04L 9/3271 |
| | | | 726/4 |
| 2013/0223230 A1* | 8/2013 | Swaminathan | H04W 76/02 |
| | | | 370/241 |

FOREIGN PATENT DOCUMENTS

| | | |
|---|---|---|
| CN | 101296159 A | 10/2008 |
| CN | 102137153 A | 7/2011 |
| CN | 102355658 A | 2/2012 |
| JP | 2005522158 A | 7/2005 |
| JP | 2014507855 A | 3/2014 |
| WO | 2009018774 A1 | 2/2009 |

OTHER PUBLICATIONS

Zeng, Y., et al, "PPP Protocol and Its Application in Internet Remote Access Technology", Journal of Information Engineering University, vol. 1, No. 1, Mar. 2000, 5 pages.
English Translation of Zeng, Y., et al, "PPP Protocol and Its Application in Internet Remote Access Technology", Journal of Information Engineering University, vol. 1, No. 1, Mar. 2000, 1 page.
Foreign Communication From a Counterpart Application, Chinese Application No. 201310356543.2, Chinese Office Action dated Apr. 1, 2017, 7 pages.
Foreign Communication From a Counterpart Application, PCT Application No. PCT/CN2014/084058, English Translation of International Search Report dated Nov. 19, 2014, 2 pages.
Foreign Communication From a Counterpart Application, PCT Application No. PCT/CN2014/084058, English Translation of Written Opinion dated Nov. 19, 2014, 6 pages.
Machine Translation and Abstract of Japanese Patent Application No. JPA2005522158, Jul. 21, 2005, 16 pages.
Machine Translation and Abstract of Japanese Patent Application No. JPA2014507855, Mar. 27, 2014, 25 pages.
Foreign Communication From a Counterpart Application, Japanese Application No. 2016-532230, Japanese Office Action dated Jan. 29, 2017, 4 pages.
Foreign Communication From a Counterpart Application, Japanese Application No. 2016-532230, English Translation of Japanese Office Action dated Jan. 31, 2017, 4 pages.
Foreign Communication From a Counterpart Application, European Application No. 14836901.0, Extended European Search Report dated Jun. 30, 2016, 6 pages.
Foreign Communication From a Counterpart Application, Chinese Application No. 201310356543.2, Chinese Office Action dated Nov. 27, 2017, 6 pages.

* cited by examiner

METHOD AND BROADBAND DEVICE FOR MODEM DIAL-UP

CROSS-REFERENCE TO RELATED APPLICATIONS

This application is a National Stage of International Application No. PCT/CN2014/084058, filed on Aug. 11, 2014, which claims priority to Chinese Patent Application No. 201310356543.2, filed on Aug. 15, 2013, both of which are hereby incorporated by reference in their entireties.

TECHNICAL FIELD

The present disclosure relates to the field of network communications technologies, and in particular, to a method and a broadband device for modem dial-up.

BACKGROUND

In a mobile broadband service, a broadband device is used as an intermediate entity between a network and a terminal such as a computer, to implement dial-up Internet access of the computer.

In a network environment of code division multiple access (CDMA) and evolution data only (EVDO), a terminal performs dial-up Internet access in a manner of modem dial-up. The terminal uses a broadband device to perform, between the broadband device and a network, link control protocol (LCP) negotiation and authentication, and Internet Protocol (IP) control protocol (IPCP) negotiation, and eventually implements dial-up Internet access.

However, with the development of wireless network technologies, the CMDA evolves from the EVDO to an evolved high rate packet data (eHRPD) network, and in an eHRPD network environment, a network side needs to perform extensible authentication protocol (EAP) authentication and vendor-specific network control protocol (VSNCP) negotiation with a terminal, so that the terminal can achieve an objective of dial-up Internet access in a manner of modem dial-up. However, the terminal does not support EAP authentication and a VSNCP negotiation, and therefore the terminal cannot perform dial-up Internet access in a manner of modem dial-up.

SUMMARY

In view of this, embodiments of the present disclosure provide a method and a broadband device for modem dial-up, to solve a technical problem that modem dial-up cannot be performed in an eHRPD network environment.

According to a first aspect, a method for modem dial-up is provided, including receiving, by a broadband device, a first LCP request message of a wireless network side device; processing an EAP authentication field of the first LCP request message into an authentication field supported by a dial-up terminal; sending the processed first LCP request message to the dial-up terminal; receiving a first LCP response message returned by the dial-up terminal; processing an authentication field of the first LCP response message into an authentication field supported by the wireless network side device; sending the processed first LCP response message to the wireless network side device; and acquiring an IP address from the wireless network side device, and sending the IP address to the dial-up terminal.

With reference to the first aspect, in a first possible implementation manner of the first aspect, the processing an EAP authentication field of the first LCP request message into an authentication field supported by a dial-up terminal includes deleting, by the broadband device, the EAP authentication field; and the processing an authentication field of the first LCP response message into an authentication field supported by the wireless network side device includes adding, by the broadband device, the EAP authentication field into the first LCP response message.

With reference to the first possible implementation manner of the first aspect, in a second possible implementation manner of the first aspect, the processing an EAP authentication field of the first LCP request message into an authentication field supported by a dial-up terminal includes replacing, by the broadband device, the EAP authentication field with a password authentication protocol (PAP) or challenge handshake authentication protocol (CHAP) authentication field; and the processing an authentication field of the first LCP response message into an authentication field supported by the wireless network side device includes replacing, by the broadband device, the PAP or CHAP authentication field in the first LCP response message with the EAP authentication field, where the first LCP response message is returned by the dial-up terminal.

With reference to the first aspect, or the first or the second possible implementation manner of the first aspect, in a third possible implementation manner of the first aspect, the acquiring an IP address from the wireless network side device includes performing EAP authentication between the broadband device and the wireless network side device according to the processed authentication field in the first acknowledgment message; and after the broadband device completes the EAP authentication between the broadband device and the wireless network side device, performing VSNCP negotiation with the wireless network side device to acquire the IP address.

With reference to the first aspect, or any one of the first to the third possible implementation manners of the first aspect, in a fourth possible implementation manner of the first aspect, the sending the IP address to the dial-up terminal includes: sending the IP address to the dial-up terminal by using the IPCP between the broadband device and the dial-up terminal.

According to a second aspect, a broadband device for modem dial-up is provided, including a request receiving unit, configured to control a receiver to receive a first LCP request message of a wireless network side device, and configured to send, to a first field processing unit, the first LCP request message received by the receiver; the first field processing unit, configured to process an EAP authentication field of the first LCP request message sent by the request receiving unit into an authentication field supported by a dial-up terminal; a request sending unit, configured to control a transmitter to send the first LCP request message processed by the first field processing unit to the dial-up terminal; an acknowledgment receiving unit, configured to control the receiver to receive a first LCP response message returned by the dial-up terminal, and configured to send, to a second field processing unit, the first LCP response message received by the receiver; the second field processing unit, configured to process an authentication field of the first LCP response message sent by the acknowledgment receiving unit into an authentication field supported by the wireless network side device; an acknowledgment sending unit, configured to control the transmitter to send the first LCP response message processed by the second field processing unit to the wireless network side device; an address acquiring unit, configured to acquire an IP address from the wireless network side device; and an address sending unit, configured to control the transmitter to send the IP address acquired by the address acquiring unit to the dial-up terminal.

With reference to the second aspect, in a first possible implementation manner of the second aspect, the first field processing unit is further configured to delete the EAP authentication field; and the second field processing unit is further configured to add the EAP authentication field into the first LCP response message.

With reference to the second aspect, in a second possible implementation manner of the second aspect, the first field processing unit is further configured to replace the EAP authentication field with a PAP or CHAP authentication field; and the second field processing unit is further configured to replace the PAP or CHAP authentication field in the first LCP response message with the EAP authentication field, where the first LCP response message is returned by the dial-up terminal.

With reference to the first or the second possible implementation manner of the second aspect, in a third possible implementation manner of the second aspect, the broadband device further includes an authentication unit, configured to, after the acknowledgment sending unit controls the transmitter to send the processed first LCP response message to the wireless network side device, perform EAP authentication between the broadband device and the wireless network side device according to the processed authentication field in the first acknowledgment message; where the address acquiring unit is further configured to, after the authentication unit completes the EAP authentication between the broadband device and the wireless network side device, perform VSNCP negotiation with the wireless network side device to acquire the IP address.

With reference to the second aspect, or any one of the first to the third possible implementation manners of the second aspect, in a fourth possible implementation manner of the second aspect, the address sending unit is specifically configured to control the transmitter to send the IP address to the dial-up terminal by using the IPCP with the dial-up terminal.

According to the method and the broadband device for modem dial-up provided in the foregoing embodiments, a broadband device processes an authentication field into an authentication field supported by a dial-up terminal and a network side device, and sends, to the dial-up terminal, an IP address obtained from a wireless network side device, so that the dial-up terminal can use a protocol supported by the dial-up terminal, that is, the dial-up terminal can use an existing protocol to perform communication with an eHRPD network.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following describes the present disclosure in further detail with reference to the accompanying drawings. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
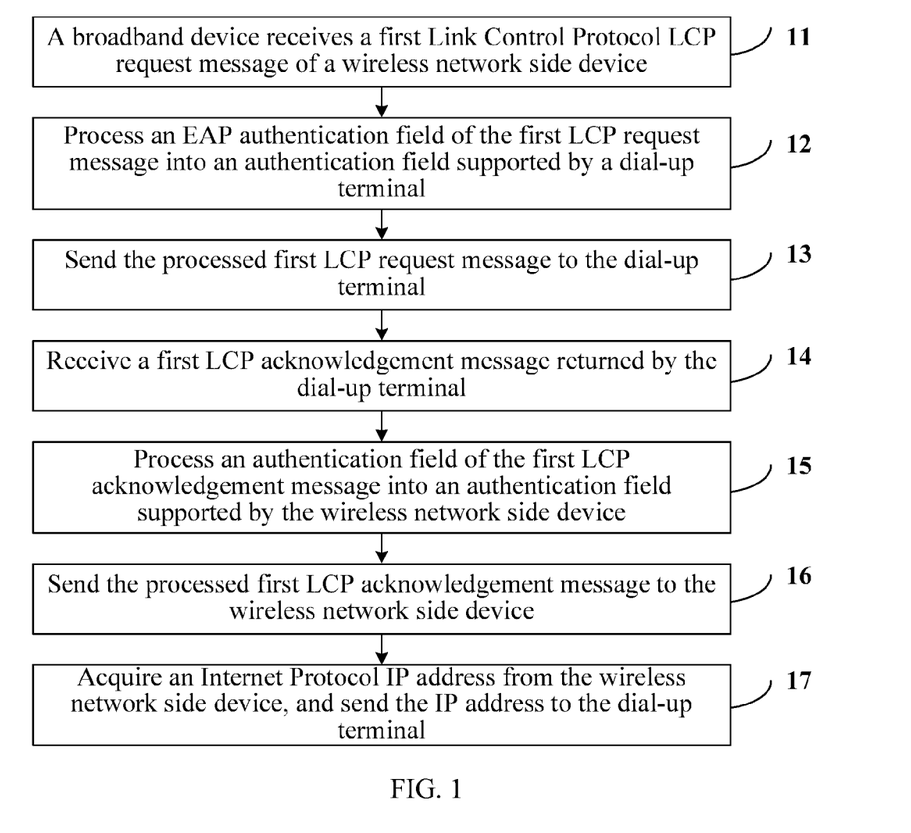
FIG. 1 is a flowchart of a method for modem dial-up according to an embodiment of the present disclosure.

FIG. 1 is a flowchart of a method for modem dial-up according to an embodiment of the present disclosure. The method for modem dial-up includes the following steps.

Step 11: A broadband device receives a first LCP request message of a wireless network side device.

Step 12: Process an EAP authentication field of the first LCP request message into an authentication field supported by a dial-up terminal.

For example, the broadband device deletes the EAP authentication field; or, for example, the broadband device replaces the EAP authentication field with a PAP or CHAP authentication field.

Step 13: Send the processed first LCP request message to the dial-up terminal.

Step 14: Receive a first LCP response message returned by the dial-up terminal.

Step 15: Process an authentication field of the first LCP response message into an authentication field supported by the wireless network side device.

For example, when the broadband device deletes the EAP authentication field in step 12, the broadband device adds the EAP authentication field into the first LCP response message.

Alternatively, for example, when the broadband device replaces the EAP authentication field with the PAP or CHAP authentication field in step 12, the broadband device replaces the PAP or CHAP authentication field in the first LCP response message with the EAP authentication field, where the first LCP response message is returned by the dial-up terminal.

Step 16: Send the processed first LCP response message to the wireless network side device. Then, the broadband device may perform EAP authentication between the broadband device and the wireless network side device. After the authentication succeeds, the broadband device may perform VSNCP negotiation with the wireless network side device.

Step 17: Acquire an IP address from the wireless network side device, and send the IP address to the dial-up terminal.

For example, the broadband device may obtain the IP address by performing the VSNCP negotiation with the wireless network side device.

When the IP address is sent to the dial-up terminal, the IP address is sent to the dial-up terminal by using the IPCP between the broadband device and the dial-up terminal.

According to the method for modem dial-up provided in this embodiment, a broadband device processes authentication fields in LCP request and acknowledgment messages, and sends, to a dial-up terminal, an IP address obtained from a wireless network side device, so that the dial-up terminal uses a protocol supported by the dial-up terminal, that is, the dial-up terminal can use an existing protocol to perform communication with an eHRPD network. In this way, problems that costs of communication between an existing dial-up terminal and an eHRPD network increase and implementation is complex because a new protocol needs to be added in the prior art are solved; only a broadband device needs to be improved, and a dial-up terminal does not need to be changed, which reduces costs and is easy to be implemented.

Figure 2:
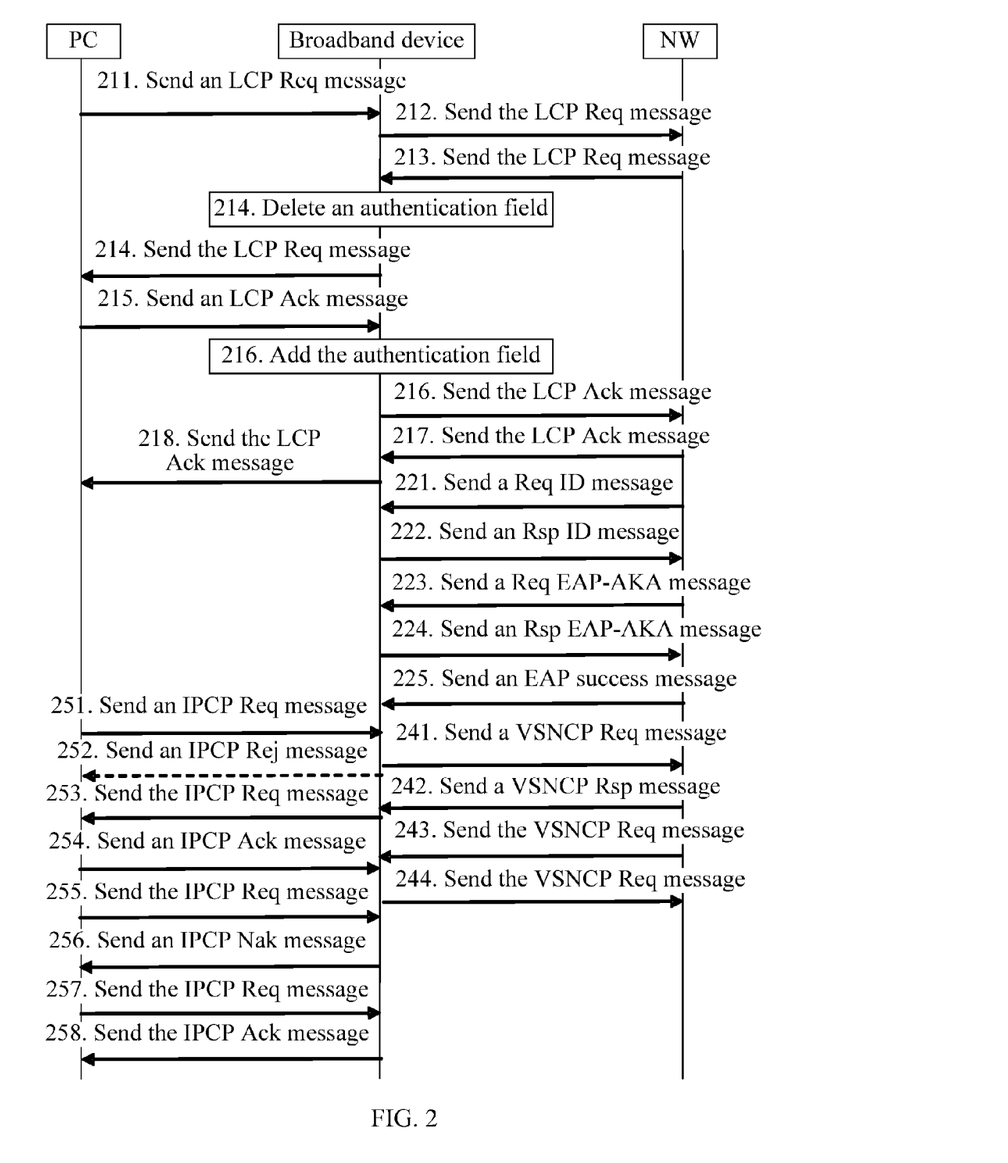
FIG. 2 is a signaling flowchart of a method for modem dial-up according to another embodiment of the present disclosure.

FIG. 2 is a signaling flowchart of a method for modem dial-up according to another embodiment of the present disclosure. The method for modem dial-up in this embodiment is in an eHRPD network environment, and includes an LCP negotiation process (P1 process) between a personal computer (PC) and a network (NW), where the NW is an eHRPD network; an EAP negotiation process (P2 process) between a broadband device and the NW; an authentication negotiation process (P3 process) between the PC and the broadband device; a VSNCP negotiation process (P4 process) between the broadband device and the NW; and an IPCP negotiation process (P5 process) between the PC and the broadband device.

The P1 process includes a first P1 process between the broadband device and the PC and a second P1 process between the broadband device and a network side, and further includes:

Step 211: The PC sends an LCP request (LCP Req) message to the broadband device.

In a point-to-point protocol (PPP), when two communication parties perform parameter negotiation, both parties need to initiate the negotiation request message. The negotiation request message carries content that a sending party expects to negotiate. According to regulations of the PPP, there are much negotiable content, for example, a maximum receive data unit, an authentication protocol to be used. These parameters may affect other subsequent communication processes of the two parties. In the PPP, the chapter "LCP Packet Formats", the LCP Req message is also referred to as a configure-request message.

Step 212: The broadband device directly forwards, to the NW, the LCP Req message sent by the PC without modifying the LCP Req message.

Step 213: The NW sends the LCP Req message to the broadband device.

Step 214: The broadband device changes content in the LCP Req message. Herein, the broadband device deletes EAP authentication in the LCP Req message (that is, removes an authentication-related field from the LCP Req message), and then forwards, to the PC, the LCP Req message which the EAP authentication is deleted.

Step 215: After receiving the LCP Req message sent by the broadband device in step 214, the PC sends an LCP acknowledgment (LCP Ack) message to the broadband device.

In the PPP, a party that receives an LCP Req message determines whether content of the LCP Req message is legal and whether all specific values in the LCP Req message can be received, and if yes, sends an LCP Ack message to the other party, to indicate that content, on which the other party expects to negotiate, in the LCP Req message is accepted. In addition, the LCP Ack message carries the content of the LCP Req message sent by the other party, that is, the content of the LCP Req message is returned to the other party. In the chapter "LCP Packet Formats" in the PPP, the LCP Req message is also referred to as a configuration acknowledgment (Configure-Ack) message.

Step 216: The broadband device changes content of the LCP Ack message. Herein, corresponding to field content removed in step 214 in the foregoing, the broadband device adds an EAP authentication field into the LCP Ack message, and then forwards, to the NW, the LCP Ack message into which the EAP authentication field is added.

Step 217: The NW sends the LCP Ack message to the broadband device.

Step 218: The broadband device forwards, to the PC, the LCP Ack message sent by the NW without modifying content of LCP Ack.

A sequence of sending the LCP Req message and the LCP Ack message is not limited to the foregoing sequence of steps, and may be determined according to an actual condition. For example, step 213 may be performed before step 211, or the two may be performed simultaneously.

In the P1 process, types and formats of messages exchanged between the PC, the broadband device, and the NW completely conform to regulations of a related protocol such as the PPP.

The P2 process includes:

Step 221: The NW sends an identity request (Req ID) message to the broadband device.

In the EAP protocol, a user identity needs to be confirmed during authentication. Further, in FIG. 2, the NW (an authenticator) sends an identity confirmation request message, that is, the Req ID request message, to the broadband device (an authenticated party). In a standard protocol, the Req ID request message is referred to as an identity-type message.

Step 222: The broadband device returns an identity response (Rsp ID) message to the NW.

In the EAP protocol, during confirmation of the user identity, a party that receives the identity confirmation request message sends self-related information to the other party. Further, in FIG. 2, that is, the broadband device (the authenticated party) sends an identity confirmation response message, that is, the Rsp ID response message, to the NW (that is, the authenticating party). In a standard protocol, the Rsp ID response message is referred to as an identity-type message.

Step 223: The NW sends a Req EAP-AKA request message to the broadband device.

The Req EAP-AKA request message is a message that is sent by an authenticating party to an authenticated party when the authenticating party requests to perform EAP-AKA authentication in an EAP-AKA authentication method. The Req EAP-AKA request message includes specific authentication information sent by the authenticating party to the authenticated party.

An actual process is not limited to the EAP-AKA authentication method, and another authentication method such as EAP-SIM authentication may also be used.

Step 224: The broadband device returns an Rsp EAP-AKA response message to the NW.

In the EAP-AKA authentication method, after receiving the Req EAP-AKA request message, the authenticated party returns a response message of Req EAP-AKA, that is, the Rsp EAP-AKA response message, to the authenticating party.

Step 225: The NW sends, to the broadband device, an EAP success message, which indicates that an EAP authentication process succeeds.

In the P2 process, types and formats of messages exchanged between the broadband device and the NW completely conform to regulations of a related protocol such as the EAP.

The P4 process further includes:

Step 241: The broadband device sends a VSNCP request (VSNCP Req) message to the NW.

According to a VSNCP related protocol, the packet exchange mechanism used in a P4 process is same as the packet exchange mechanism used in an P1 process, but only negotiation content is different. In the P4 process, each party of negotiation needs to send a VSNCP Req message to the other party, and after receiving the VSNCP Req message, the other party returns a corresponding VSNCP response message (VSNCP Rsp message).

Step 242: The NW sends a VSNCP Rsp to the broadband device, and in this case, the broadband device has obtained an IP address allocated by the NW.

Corresponding to the foregoing VSNCP Req message, the VSNCP Rsp message is a response message of the VSNCP Req message. For example, in FIG. 2, the VSNCP Rsp message that is sent by the NW to the broadband device includes information such as an IP address that is allocated by the NW side to the PC.

Step 243: The NW sends the VSNCP Req message to the broadband device.

Step 244: The broadband device sends the VSNCP Rsp message to the NW.

In the P4 process, formats and types of data packets exchanged between the broadband device and the NW completely conform to regulations of a related protocol such as the VSNCP protocol.

In this embodiment, because the broadband device deletes EAP authentication content in step 214 and adds the EAP authentication content into the LCP Ack message in step 216, there is no authentication process between the PC and the broadband device, that is, after the P1 process, the PC directly enters an P5 process with the broadband device.

The P5 process includes:

Step 251: The broadband device sends an IPCP Req message to the broadband device.

According to regulations of an IPCP related protocol, a packet exchange mechanism used in an P5 process is the same as the packet exchange mechanism used in the P1 process, but only negotiation content is different. In the P5 process, each party of negotiation needs to send an IPCP Req message to the other party, and after receiving the IPCP Req message, the other party returns a corresponding message, that is, an IPCP Ack message, to indicate that negotiation succeeds.

Step 252: The broadband device sends an IPCP rejection (IPCP Rej) message to the broadband device, to reject some negotiation fields in the IPCP Req message.

The IPCP Rej message corresponds to the foregoing IPCP Req message. According to the regulations of the IPCP related protocol, when some negotiation fields of the other party are not supported, the IPCP Rej message needs to be returned to the other party, and the returned IPCP Rej message carries the unsupported fields. After receiving the returned IPCP Rej message, the other party generally deletes these fields from the IPCP Req message, and then sends the IPCP Req message again.

Step 253: The broadband device sends the IPCP Req message to the PC.

Step 254: The PC sends an IPCP Ack message to the broadband device. The IPCP Ack message corresponds to the foregoing IPCP Req message, and is an acknowledgment message of the IPCP Req message.

Step 255: The PC sends the IPCP Req message to the broadband device again.

Step 256: The broadband device performs a corresponding operation according to whether the IP address (referring to step 242) is acquired.

If the broadband device has acquired the IP address at this time, the broadband device returns an IPCP Nak message to the PC, and the returned IPCP Nak message carries the acquired IP address.

If the broadband device has not acquired the IP address at this time, the broadband device starts a timer. If the broadband device acquires the IP address when the timer reaches a preset time or before the timer reaches a preset time, the broadband device returns an IPCP Nak message to the PC; otherwise, the broadband device does not return an IPCP Nak message to the PC, and the PC repeats step 255 and sends the IPCP Req message. The preset time is less than a time when the PC sends the IPCP Req message again, and a specific value is determined according to a product commissioning status. Alternatively, the broadband device does not start a timer, and does not return an IPCP Nak message to the PC either.

The IPCP Nak message corresponds to the foregoing IPCP Req message. According to the regulations of the IPCP related protocol, when some negotiation fields of the other party are supported but specific values of the fields are not agreed on, an IPCP Nak message needs to be returned to the other party. The returned IPCP Nak message carries specific values that the other party are expected to set for the fields. After receiving the returned IPCP Nak message, the other party generally sets the values of the fields to values specified in the IPCP Nak, and sends the IPCP Req message again.

In a case in which the broadband device has not obtained the IP address when receiving the IPCP Req message, if the broadband device does not start a timer, and does not return an IPCP Nak message to the PC either, according to regulations of a Request for Comments (RFC)1661 protocol, when the PC does not receive any response within a certain period, the PC sends the IPCP Req to the broadband device again (which is equivalent to that step 255 is repeated). If the broadband device does not acquire the IP address all the time, step 255 is performed repeatedly many times, until the PC side does not perform step 255 any longer.

Step 257: It is first assumed herein that the broadband device sends an IPCP Nak message to the PC in step 256, and after acquiring the IP address according to the IPCP Nak message, the PC sends the IPCP Req message to the broadband device again.

Step 258: The broadband device sends the IPCP Ack message to the PC.

Formats and types of data packets exchanged in the P5 process completely conform to regulations of a related protocol such as the IPCP. According to the PPP, the IPCP may be replaced with another protocol.

In this embodiment, because the broadband device deletes EAP authentication content in step 214 and adds the EAP authentication content into the LCP Ack message in step 216, in a case in which there is no authentication process between the PC and the broadband device, LCP negotiation between the broadband device and the network side is not affected.

Figure 3:
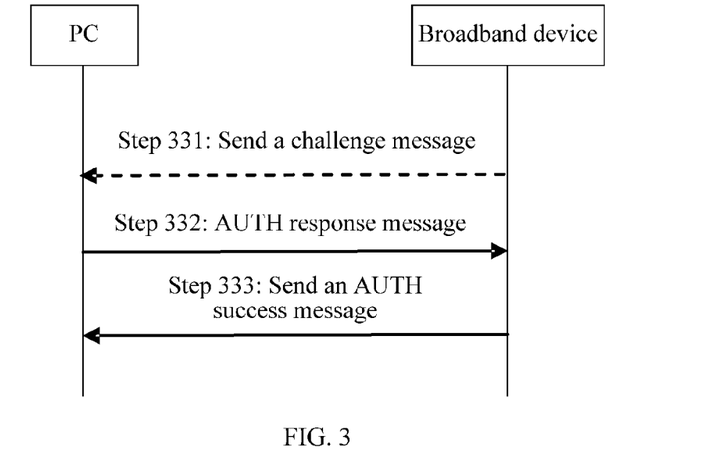
FIG. 3 is a signaling flowchart of authentication between a PC and a broadband device in a method for modem dial-up according to another embodiment of the present disclosure.

If an authentication process between the PC and the broadband device needs to be performed, authentication may also be performed between the PC and the broadband device, as shown in FIG. 3.

FIG. 3 is a signaling flowchart of authentication between a PC and a broadband device in a method for modem dial-up according to another embodiment of the present disclosure. This embodiment is similar to the embodiment shown in FIG. 2, and a difference lies in that, in a P1 process in this embodiment, an authentication related field in a negotiation process needs to be replaced. After the broadband device deletes authentication content, a PAP or CHAP authentication field is added into an LCP Req message, and the PAP or CHAP authentication field is deleted from an LCP Ack message sent by a PC. Moreover, a P3 process is further added in this embodiment.

In the P1 process, the PC sends an LCP Req message to the broadband device, and after receiving the LCP Req message, the broadband device directly forwards, to an NW, the LCP Req message without modifying the LCP Req message.

The NW sends the LCP Req message to the broadband device.

After receiving the LCP Req message sent by the NW, the broadband device removes an EAP authentication related field from the LCP Req message, adds CHAP authentication related information into the LCP Req message, and then forwards the LCP Req message to the PC.

After receiving the LCP Req message forwarded by the broadband device, the PC sends an LCP Ack message to the broadband device. Similarly, the LCP Ack message includes the CHAP authentication related information.

After receiving the LCP Ack message sent by the PC, the broadband device removes the CHAP authentication related information from the LCP Ack message, adds the EAP authentication field into the LCP Ack message, and then forwards the LCP Ack message to the NW.

After receiving the LCP Req message sent by the broadband device, the NW sends the LCP Ack message to the broadband device.

The broadband device directly forwards the LCP Ack message to the PC without modifying the LCP Ack message sent by the LCP Ack NW, to complete the P1 process.

The P3 process further includes:

Step 331: The broadband device sends an authentication challenge (Challenge) message to the PC. The Challenge message is a character string. According to a protocol, after obtaining the character string, a receiving party (which refers to the PC in this embodiment) performs calculation according to a particular algorithm, to obtain content of an authentication response (AUTH Response) message in step 332.

The Challenge message may also be sent together to the PC in the P1 process when the broadband device sends the LCP Req message to the PC.

Step 332: After receiving the Challenge message, the PC obtains content of the AUTH Response message, and sends the AUTH Response message to the broadband device.

Step 333: The broadband device sends an authentication success (AUTH Success) message to the PC, to indicate that authentication succeeds.

Formats and types of data packets exchanged in the foregoing P3 process completely conform to regulations of a related protocol such as the CHAP.

Another manner, for example, a PAP authentication manner, may also be selected for authentication between the PC and the broadband device. Regardless of which authentication manner is used, authentication is performed between the PC and the broadband device, it is only needed that the broadband device can support an authentication manner that is supported by the PC side, and the authentication manner supported by the PC side does not need to be changed.

In the embodiments shown in FIG. 2 and FIG. 3, there is no requirement for a sequence of the P2 process, the P3 process, and the P5 process. Similarly, there is no requirement for a sequence of the P4 process and the P5 process either, which may be performed simultaneously, or may not be performed simultaneously.

In the foregoing method embodiments, modem drivers of a PC side and a broadband device side remain unchanged, and a broadband device performs internal conversion on P1, P3, and P5 process between the broadband device and a PC (RM interface negotiation) and P1, P3, and P4 process between the broadband device and a network side (UM interface negotiation), in order to complete RM interface negotiation and UM interface negotiation respectively, and to combine the RM interface negotiation and the UM interface negotiation organically to complete an entire modem dial-up process in an eHRPD network, so that the broadband device can flexibly and compatibly include various authentication manners such as an access manner having no authentication process, thereby implementing flexible authentication between the PC side and the broadband device. Moreover, the broadband device does not need to update a driver, but needs to update only an upper-layer protocol layer to perform modem dial-up in an eHRPD network. The PC can perform modem dial-up in the eHRPD network without needing to support the VSNCP and update a driver either. That is, for either a broadband device that supports only modem dial-up or a product that supports both network driver interface specification (NDIS) dial-up and modem dial-up, the PC side does not need to upgrade a protocol (support the VSNCP), and does not need to install a specific driver either, and only program optimization needs to be performed on the broadband device side to perform modem dial-up in the eHRPD network. In this way, if a product exists in the market or held by a user, it needs to upgrade only optimized software into the broadband device, which protects compatibility of the product and ensures commonality of the product. In addition, if it is a newly developed broadband device, a user can perform modem dial-up in an eHRPD network without any processing. This can bring desirable user experience to the user, thereby improving market competitiveness of the product. Application scenarios of an eHRPD network are further expanded, so that the network is used more fully, existing investments of operators are protected, and economical benefits are brought to the operators.

Figure 4:
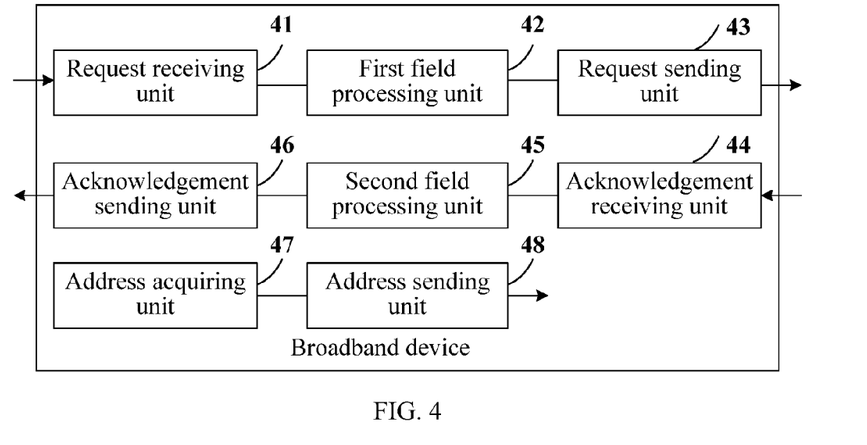
FIG. 4 is a schematic structural diagram of a broadband device for modem dial-up according to another embodiment of the present disclosure.

FIG. 4 is a schematic structural diagram of a broadband device for modem dial-up according to another embodiment of the present disclosure. The broadband device described in this embodiment is used to implement the method provided in the embodiment shown in FIG. 1, and includes a request receiving unit 41, configured to control a receiver to receive a first LCP request message of a wireless network side device, and configured to send, to a first field processing unit 42, the first LCP request message received by the receiver; the first field processing unit 42, configured to process an EAP authentication field of the first LCP request message sent by the request receiving unit 41 into an authentication field supported by a dial-up terminal; a request sending unit 43, configured to control a transmitter to send the first LCP request message processed by the first field processing unit 42 to the dial-up terminal; an acknowledgment receiving unit 44, configured to control the receiver to receive a first LCP response message returned by the dial-up terminal, and configured to send, to a second field processing unit, the first LCP response message received by the receiver; the second field processing unit 45, configured to process an authentication field of the first LCP response message sent by the acknowledgment receiving unit 44 into an authentication field supported by the wireless network side device; an acknowledgment sending unit 46, configured to control the transmitter to send the first LCP response message processed by the second field processing unit 45 to the wireless network side device; an address acquiring unit 47, configured to acquire an IP address from the wireless network side device; and an address sending unit 48, configured to control the transmitter to send the IP address acquired by the address acquiring unit 47 to the dial-up terminal.

Exemplarily, the first field processing unit 42 is further configured to delete the EAP authentication field; and the second field processing unit 45 is further configured to add the EAP authentication field into the first LCP response message.

Alternatively, the first field processing unit 42 is further configured to replace the EAP authentication field with a PAP or CHAP authentication field; and the second field processing unit 45 is further configured to replace the PAP or CHAP authentication field in the first LCP response message with the EAP authentication field, where the first LCP response message is returned by the dial-up terminal.

Further, the broadband device provided in this embodiment of the present disclosure may include an authentication unit, configured to, after the acknowledgment sending unit 46 controls the transmitter to send the processed first LCP response message to the wireless network side device, perform EAP authentication between the broadband device and the wireless network side device according to the processed authentication field in the first acknowledgment message; where the address acquiring unit 47 is further configured to, after the authentication unit completes the EAP authentication between the broadband device and the wireless network side device, perform VSNCP negotiation with the wireless network side device to acquire the IP address.

Exemplarily, the address sending unit 48 is further configured to control the transmitter to send the IP address to the dial-up terminal by using the IPCP with the dial-up terminal.

Figure 5:
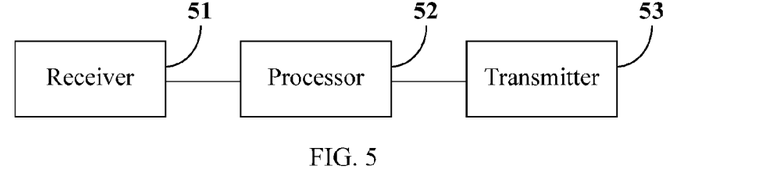
FIG. 5 is a schematic structural diagram of a broadband device for modem dial-up according to another embodiment of the present disclosure.

FIG. 5 is a schematic structural diagram of a broadband device for modem dial-up according to another embodiment of the present disclosure. The broadband device described in this embodiment is used to implement the method provided in the embodiment shown in FIG. 1, and includes a receiver 51, a processor 52, and a transmitter 53.

The receiver 51 is configured to, under the control of the processor 52, receive a first LCP request message of a wireless network side device and a first LCP response message returned by the dial-up terminal.

The processor 52 is configured to process an EAP authentication field of the first LCP request message received by the receiver 51 into an authentication field supported by the dial-up terminal; and control the transmitter 53 to send the processed first LCP request message to the dial-up terminal.

The processor 52 is further configured to process an authentication field of the first LCP response message received by the receiver 51 into an authentication field supported by the wireless network side device; and control the transmitter 53 to send the processed first LCP response message to the wireless network side device.

The processor 52 is further configured to acquire an IP address from the wireless network side device, and control the transmitter 53 to send the IP address acquired by the transmitter 53 to the dial-up terminal.

Exemplarily, the processor 52 may be further configured to delete the EAP authentication field; and the processor 52 may be further configured to add the EAP authentication field into the first LCP response message.

Alternatively, the processor 52 may be further configured to replace the EAP authentication field with a PAP or CHAP authentication field; and the processor 52 may be further configured to replace the PAP or CHAP authentication field in the first LCP response message with the EAP authentication field, where the first LCP response message is returned by the dial-up terminal.

Further, the processor 52 is further configured to, after the transmitter 53 is controlled to send the processed first LCP response message to the wireless network side device, perform EAP authentication between the broadband device and the wireless network side device according to the processed authentication field in the first acknowledgment message.

The processor 52 is further configured to, after the EAP authentication between the broadband device and the wireless network side device is completed, perform P4 with the wireless network side device to acquire the IP address.

Exemplarily, the transceiver 51 may be further configured to control the transmitter 53 to send the IP address to the dial-up terminal by using the IPCP with the dial-up terminal.

An embodiment of the present disclosure further provides a computer program product. The computer program product includes a computer readable medium. The readable medium includes a first set of program code, which is used to execute the steps in the method shown in FIG. 1: receiving a first LCPrequest message of a wireless network side device; processing an EAP authentication field of the first LCP request message into an authentication field supported by a dial-up terminal; sending the processed first LCP request message to the dial-up terminal; receiving a first LCP response message returned by the dial-up terminal; processing an authentication field of the first LCP response message into an authentication field supported by the wireless network side device; sending the processed first LCP response message to the wireless network side device; and acquiring an IP address from the wireless network side device, and sending the IP address to the dial-up terminal.

Optionally, the processing an EAP authentication field of the first LCP request message into an authentication field supported by a dial-up terminal includes deleting the EAP authentication field; and the processing an authentication field of the first LCP response message into an authentication field supported by the wireless network side device includes adding the EAP authentication field into the first LCP response message.

Optionally, the processing an EAP authentication field of the first LCP request message into an authentication field supported by a dial-up terminal includes replacing the EAP authentication field with a PAP or CHAP authentication field; and the processing an authentication field of the first LCP response message into an authentication field supported by the wireless network side device includes replacing the PAP or CHAP authentication field in the first LCP response message with the EAP authentication field, where the first LCP response message is returned by the dial-up terminal.

Optionally, the acquiring an IP address from the wireless network side device includes performing EAP authentication between the broadband device and the wireless network side device according to the processed authentication field in the first acknowledgment message; and after the EAP authentication between the broadband device and the wireless network side device is completed, performing VSNCP negotiation with the wireless network side device to acquire the IP address.

Optionally, the sending the IP address to the dial-up terminal includes sending the IP address to the dial-up terminal by using the IPCP with the dial-up terminal.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes any medium that can store program code, such as a read only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present disclosure.

What is claimed is:

1. A method for modem dial-up, the method comprising:
   receiving, by a broadband device from a wireless network side device, a first Link Control Protocol (LCP) request message;
   generating a processed first LCP request message by processing an Extensible Authentication Protocol (EAP) authentication field of the first LCP request message from the wireless network side device into an authentication field supported by a dial-up terminal;
   sending the processed first LCP request message to the dial-up terminal;
   receiving a first LCP response message from the dial-up terminal;
   generating a processed first LCP response message by processing an authentication field of the first LCP response message from the dial-up terminal into a different authentication field supported by the wireless network side device, wherein the different authentication field supported by the wireless network side device is the EAP authentication field;
   sending the processed first LCP response message to the wireless network side device;
   acquiring an Internet Protocol (IP) address from the wireless network side device; and
   sending the IP address to the dial-up terminal.

2. The method according to claim 1, wherein processing the EAP authentication field of the first LCP request message into the authentication field supported by the dial-up terminal comprises deleting, by the broadband device, the EAP authentication field, and wherein processing the authentication field of the first LCP response message into the authentication field supported by the wireless network side device comprises adding, by the broadband device, the EAP authentication field into the first LCP response message.

3. The method according to claim 1, wherein processing the EAP authentication field of the first LCP request message into the authentication field supported by the dial-up terminal comprises replacing, by the broadband device, the EAP authentication field with a Password Authentication Protocol (RAP) or Challenge Handshake Authentication Protocol (CHAP) authentication field, and wherein processing the authentication field of the first LCP response message into the authentication field supported by the wireless network side device comprises replacing, by the broadband device, the PAP or CHAP authentication field in the first LCP response message with the EAP authentication field, wherein the first LCP response message is returned by the dial-up terminal.

4. The method according to claim 1, wherein acquiring the IP address from the wireless network side device comprises:
   performing EAP authentication between the broadband device and the wireless network side device according to the EAP authentication field in the processed first LCP response message; and
   performing Vendor-Specific Network Control Protocol (VSNCP) negotiation with the wireless network side device to acquire the IP address after the broadband device completes the EAP authentication between the broadband device and the wireless network side device.

5. The method according to claim 2, wherein acquiring the IP address from the wireless network side device comprises:
   performing EAP authentication between the broadband device and the wireless network side device according to the EAP authentication field in the processed first LCP response message; and
   performing Vendor-Specific Network Control Protocol (VSNCP) negotiation with the wireless network side device to acquire the IP address after the broadband device completes the EAP authentication between the broadband device and the wireless network side device.

6. The method according to claim 3, wherein acquiring the IP address from the wireless network side device comprises:
   performing EAP authentication between the broadband device and the wireless network side device according to the authentication field in the processed first LCP response message; and
   performing Vendor-Specific Network Control Protocol (VSNCP) negotiation with the wireless network side device to acquire the IP address after the broadband device completes the EAP authentication between the broadband device and the wireless network side device.

7. The method according to claim 1, wherein sending the IP address to the dial-up terminal comprises sending the IP address to the dial-up terminal using an IP Control Protocol (IPCP) negotiation between the broadband device and the dial-up terminal.

8. A broadband device for modem dial-up, the broadband device comprising:
   a receiver;
   a transmitter; and
   a processor coupled to the receiver and the transmitter and configured to:
      control the receiver to receive a first Link Control Protocol (LCP) request message from a wireless network side device;
      generate a processed first LCP request message by processing an Extensible Authentication Protocol (EAP) authentication field of the first LCP request message into an authentication field supported by a dial-up terminal, wherein the authentication field supported by the dial-up terminal is different than the EAP authentication field;

control the transmitter to send the processed first LCP request message to the dial-up terminal;

control the receiver to receive a first LCP response message from the dial-up terminal;

generate a processed first LCP response message by processing an authentication field of the first LCP response message into a different authentication field supported by the wireless network side device, wherein the authentication field supported by the wireless network side device is the EAP authentication field;

control the transmitter to send the processed first LCP response message to the wireless network side device;

acquire an Internet Protocol (IP) address from the wireless network side device; and control the transmitter to send the IP address to the dial-up terminal.

9. The broadband device according to claim 8, wherein the processor is configured to:

generate the processed first LCP request message by deleting the EAP authentication field; and generate the processed first LCP response message by adding the EAP authentication field into the first LCP response message.

10. The broadband device according to claim 8, wherein the processor is configured to:

generate the processed first LCP request message by replacing the EAP authentication field with a Password Authentication Protocol (PAP) or Challenge Handshake Authentication Protocol (CHAP) authentication field; and generate the processed first LCP response message by replacing the PAP or CHAP authentication field in the first LCP response message with the EAP authentication field.

11. The broadband device according to claim 8, wherein the processor is configured to:

perform EAP authentication between the broadband device and the wireless network side device according to the EAP authentication field in the processed first LCP response message after controlling the transmitter to send the processed first LCP response message to the wireless network side device; and perform Vendor-Specific Network Control Protocol (VSNP) negotiation with the wireless network side device to acquire the IP address after completing the EAP authentication between the broadband device and the wireless network side device.

12. The broadband device according to claim 9, wherein the processor is configured to:

perform EAP authentication between the broadband device and the wireless network side device according to the EAP authentication field in the processed first LCP response message after controlling the transmitter to send the processed first LCP response message to the wireless network side device; and perform Vendor-Specific Network Control Protocol (VSNP) negotiation with the wireless network side device to acquire the IP address after completing the EAP authentication between the broadband device and the wireless network side device.

13. The broadband device according to claim 10, wherein the processor is configured to:

perform EAP authentication between the broadband device and the wireless network side device according to the EAP authentication field in the processed first LCP response message after controlling the transmitter to send the processed first LCP response message to the wireless network side device; and perform Vendor-Specific Network Control Protocol (VSNP) negotiation with the wireless network side device to acquire the IP after completing the EAP authentication between the broadband device and the wireless network side device.

14. The broadband device according to claim 8, wherein the processor is configured to control the transmitter to send the IP address to the dial-up terminal using an IP Control Protocol (IPCP) with the dial-up terminal.

15. The broadband device according to claim 9, wherein the processor is configured to control the transmitter to send the IP address to the dial-up terminal using an IP Control Protocol (IPCP) with the dial-up terminal.

16. The broadband device according to claim 10, wherein the processor is configured to control the transmitter to send the IP address to the dial-up terminal using an IP Control Protocol (IPCP) with the dial-up terminal.

17. The broadband device according to claim 11, wherein the processor is configured to control the transmitter to send the IP address to the dial-up terminal using an IP Control Protocol (IPCP) with the dial-up terminal.

18. The broadband device according to claim 12, wherein the processor is configured to control the transmitter to send the IP address to the dial-up terminal by using an IP Control Protocol (IPCP) with the dial-up terminal.

19. The broadband device according to claim 13, wherein the processor is configured to control the transmitter to send the IP address to the dial-up terminal by using an IP Control Protocol (IPCP) with the dial-up terminal.

20. The method according to claim 1, wherein the dial-up terminal corresponds to a personal computer, and wherein the wireless network side device corresponds to an evolved high rate packet data (eHRPD) network.

* * * * *

UNITED STATES PATENT AND TRADEMARK OFFICE
CERTIFICATE OF CORRECTION

PATENT NO. : 10,009,290 B2
APPLICATION NO. : 14/901880
DATED : June 26, 2018
INVENTOR(S) : Peng Zhao It is certified that error appears in the above-identified patent and that said Letters Patent is hereby corrected as shown below:

On the Title Page

Item (30), Line 1: "201310356543" should be "201310356543.2"

In the Claims

Column 14, Line 6 Claim 3: "(RAP)" should be "(PAP)"

Signed and Sealed this
Twenty-first Day of August, 2018

Andrei Iancu
*Director of the United States Patent and Trademark Office*